Aug. 12, 1947. O. R. NEMETH 2,425,704
POWER DRIVEN INTERMITTENT STRIP FILM MECHANISM
Filed May 22, 1944
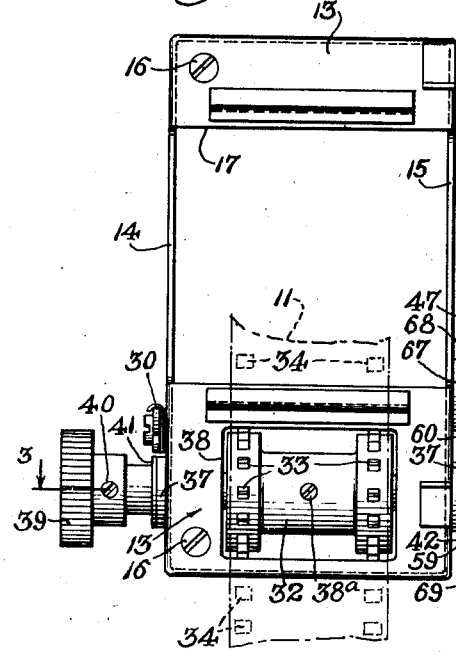
Fig.1.
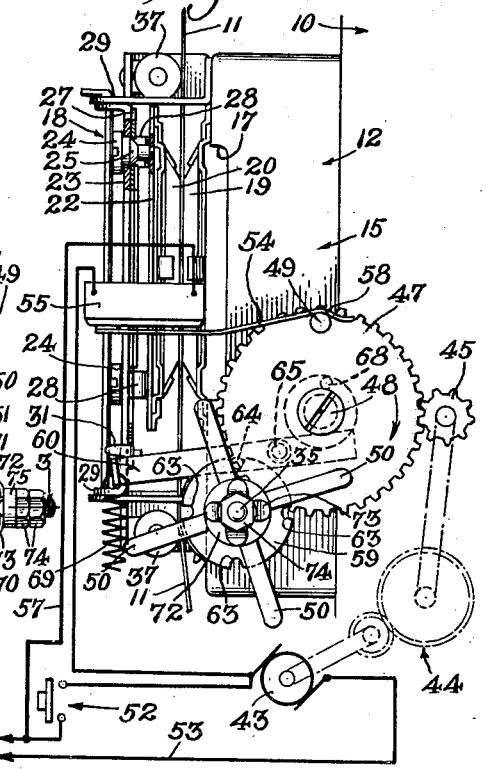
Fig.2.
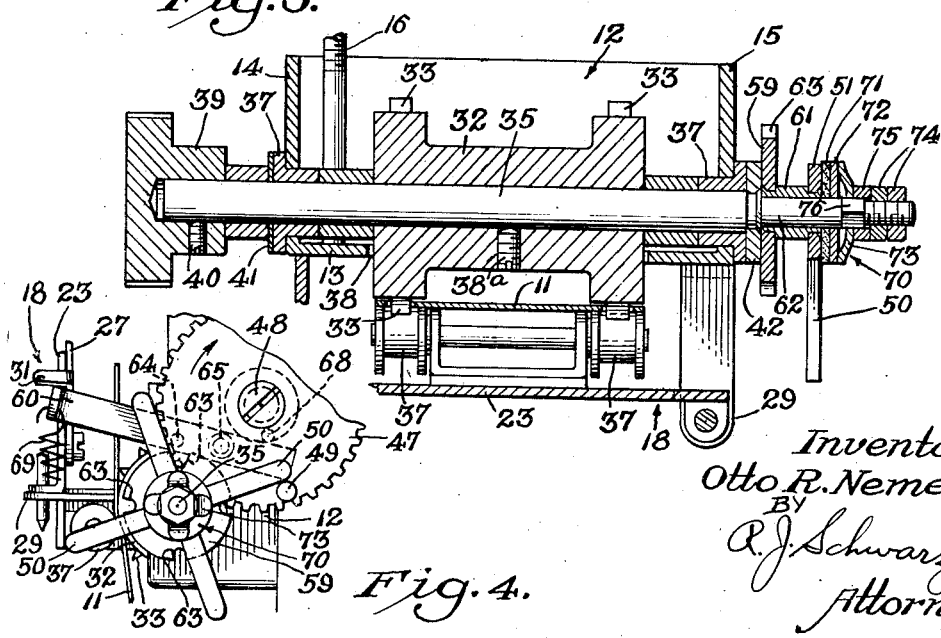
Fig.3.
Fig.4.
Inventor
Otto R. Nemeth
By
R. J. Schwarz
Attorney.

Patented Aug. 12, 1947

2,425,704

UNITED STATES PATENT OFFICE 2,425,704

POWER-DRIVEN INTERMITTENT STRIP FILM MECHANISM

Otto R. Nemeth, Chicago, Ill.

Application May 22, 1944, Serial No. 536,721

5 Claims. (Cl. 88—28)

1

This invention relates to improvements in strip film projectors adaptable for educational or amusement purposes where a series of "still" pictures or images is to be projected onto a screen, and more particularly concerns novel means for handling the film in the projection zone of the projector.

There has been a definite need in strip film projectors for a really simple, efficient, positive and readily adjustable intermittent film handling means. Each picture image must be framed as accurately as possible, and the transition from one framed picture to the next must be accomplished as nearly as practicable instantaneously, while imposing a minimum of strain upon the film. Further, during projection intervals the film must be completely stationary and undistorted for clarity in the projected image.

My invention has as an object the provision in strip film projectors of novel and improved film handling means of simple, efficient, positively acting and reliable construction, operable with a high degree of precision although quite liberal manufacturing tolerances are permitted with a view to enabling low cost mass production of the apparatus.

Another object is to provide intermittent strip film handling mechanism of self-contained unitary character in which the film is alternately held stationary and advanced one picture frame at a time.

Another object is to provide for alternate holding and advancement of the film strip in a closely co-ordinated manner and with a smoothly transitional action through the medium of improved operating mechanism.

Another object of the invention is to provide a film-gripping type of film gate and intermittently operable film-advancing means operatively co-ordinated by common actuating means.

Another object of the invention is to provide an improved intermittent film advancing mechanism including a novel indexing structure.

Another object of the invention is to provide improved power actuated film advancing means for a strip film projector, especially well adapted for remote control operation.

Still another object of the invention is to provide simple and effective means for adjusting the framing of the images on the strip film relative to the projection aperture.

Other objects and novel features of the invention will be apparent from the following description and the accompanying single sheet of drawings in which:

Figure 1 is a front elevational view of the film gate structure of a strip film projector embodying the features of the invention.

Fig. 2 is a right side elevational view of the structure shown in Fig. 1, but having certain associated features included diagrammatically.

Fig. 3 is an enlarged horizontal sectional detail view taken substantially in the plane of line 3—3 of Fig. 1.

Fig. 4 is a fragmentary side elevational view looking at the right side of the device and showing certain parts in a different relationship assumed during operation, as compared to Fig. 2.

In a strip film projector 10, a series of framed images upon a strip of film 11 of adequate length to carry any particular subject is advanced intermittently one frame at a time through the projector to enable projection of the images onto the usual screen. Inasmuch as the present invention is concerned only with features of the film handling means, details involving the customary projection lamp and optical system have been omitted as mere matters of choice or preference.

According to the present invention, the film handling means is preferably constructed as a self-contained unit supported by a frame structure 12. In a convenient, compact and inexpensive form, the frame structure 12 may be constructed of sheet metal in a vertically elongated, box-like form providing a front wall 13 and side walls 14 and 15. Removable attachment of the frame 12 to the contiguous projector housing may be effected through the medium of screws or bolts 16. Within the upper portion of the front wall 13 is a projection opening 17 in front of which is mounted a film guide structure 18 comprising means for guiding the film in front of and past the projection opening and for holding the film steady during projection intervals.

As shown, the film guide structure 18 may include film gripping and flattening means such as a pair of opposed transparent plates 19 and 20 forming, in a sense, a window for the projection opening 17. The film strip 11 is engaged and held flat between the plates. The gate plate 19 is mounted stationary on the front wall 12. The gate plate 20 is mounted for normal resilient film-flattening cooperation with the companion plate 19 but is adapted to be retracted or separated therefrom so as to release the interposed film strip 11 for advancing movement therebetween.

A convenient retractable mounting for the movable gripper plate 20 may comprise a supporting frame 22 carried by a door panel 23 through the medium of stud bolts 24 which are adapted for axial movement relative to the door panel 23. The stud bolts 24 project a substantial distance inwardly from the inside of the door panel 23 to maintain the frame 22 in spaced relation thereto and are formed with cam surfaces 25 engageable by a camming plate 27. The latter has apertures therethrough for passage of the stud bolts and the edges defining such apertures are adapted to act upon the cam surfaces 25 to retract the stud bolts 24 and thereby the plate-carrying frame 22 against the action of leaf springs 28 which are normally effective to urge the gripper panel 20 into film-gripping position.

The door panel 23 may be hinged as at 29 adjacent to its upper and lower corners along one side and normally held closed by a latch 30 and is adapted to be opened for threading the film strip 11 in place when loading the projector.

Means for actuating the camming plate 27 preferably comprises a lever 31 which is pivotally mounted upon the door 23 under the lower edge of the camming plate 27 so that as the lever 31 is pivoted upwardly it will drive the camming plate 27 upwardly into camming relation to the cam surfaces 25 on the stud bolts 24. When the upward force against the lever 31 is released, action of the springs 28 causes the stud bolts 24 to return from the retracted position and drive the camming plate 27 down to initial position. A more detailed description of the film gate structure 18 may be had by reference to my copending application Serial No. 536,720, filed May 22, 1944.

A salient feature of the present invention resides in the means whereby the film is intermittently advanced an image frame at a time at the will of the user or operator of the projector. Accordingly the film strip 11 is engaged by a conventional film sprocket 32 having projections or teeth 33 engaging the usual marginal sprocket apertures 34 in the film. Rotatable mounting for the sprocket 32 is provided by a shaft 35 journaled in bearings 37 disposed in the side walls 14 and 15 below the projection aperture 17 and in such relation to the front wall 13 that the sprocket projects through an opening 38 provided therefor in the front wall. Teeth 33 on the sprocket 32 extend into the vertical plane of the film strip 11, which is held against the sprocket by a cooperating set of grooved rollers 37 suitably mounted on the inner face of the door 23.

The sprocket 32 is secured fixedly to the shaft 35 by means such as a set screw 38ª, and the shaft is held against axial movement so as to maintain the sprocket centered in the opening 38. Such centering means may comprise a knob 39 secured by means of a set screw 40 to one end of the shaft and bearing against a washer 41 engaging the face of the adjacent bearing 37 to hold the shaft against movement in one direction, while the opposite end of the shaft carries a collar 42 fixedly secured thereto and serving as a permanent axial stop against movement of the shaft in the opposite direction.

Intermittent rotation of the shaft 35 and the sprocket 32 is effected by power driven means such as a motor 43 (Fig. 2) acting through a transmission gear train 44 including a driving pinion 45 to actuate a driving gear 47. A rotary mount for the driving gear 47 is provided by a bolt 48 secured to the adjacent side wall 15 of the supporting frame.

In the present instance, the relationship is such that each full revolution of the gear 47 will effect a one-quarter revolution of the film sprocket 32 and advance the film one full image frame. To this end as the gear 47 rotates clockwise, as seen in Fig. 2, a laterally projecting stud 49 engages an arm 50 of a four-arm star wheel 51 carried by the shaft 35. The arrangement is such that in the continuing rotation of the gear 47 interengagement of the stud 49 and the contacted arm 50 is of sufficient duration to swing the arm through a quarter revolution of the star wheel and shaft, whereafter the stud 49 leaves the arm. Simultaneously the next succeeding arm 49 is interposed in the path of the stud to be contacted by the stud in the following rotation of the gear.

Means for controlling the motor 43 to operate intermittently preferably comprises an electrical circuit adapted to be manually closed at the will of the operator of the machine. For this purpose, a normally open starting switch 52 may be conveniently located on the projector, or at the end of a remote control cable, for closing a primary motor energizing circuit 53. Upon closing of the switch 52, the motor 43 instantly operates at high speed and the gear 47 is accordingly rotated at once to carry the stud 49 away from and release from the switch-opening condition a flexible operating arm 54 controlling a running switch 55 of the normally closed snap type. This effects closing of a secondary circuit 57 which bypasses the starting switch 52 and thus keeps the motor energized although in normal course of operation the starting switch 52 is allowed to open after initiation of motor action. Upon completion of each full revolution of the gear 47, the stud 49 contacts and actuates the switch arm 54 to open the running switch 55 and break the secondary circuit 57, thus de-energizing the motor 43.

By preference, the flexible switch arm 54 serves also as a brake upon coasting of the gear 47 following de-energizing of the motor 43. For this purpose the switch arm 54 is of such a length as to enable substantial flexure beyond normal requirements for operating the running switch 55, and the disposition of the switch 55 relative to the stud 49 is such that even after the arm 54 has been moved by the stud sufficiently to close the switch the arm is subjected to continuing flexure with gradually increasing resilient frictional braking pressure against the stud as the spring loading of the arm increases. As further assistance in the braking function, the spring arm 54 may be provided with a bend 58 adjacent to its end providing a shallow latching indentation within which the stud 49 is engageable at the point of approximate dissipation of coasting momentum. The nature of the latch indentation 58 is such, of course, that it affords only relatively superficial resistance to movement of the stud 49. Hence, it substantially instantaneously releases the stud without appreciable drag upon resumption of driving rotation of the gear 47.

Registration and retention of the framed image in the projection axis of the projector after each intermittent advance is assured by an indexing structure comprising, in the present instance, a rotatable indexing disc 59 and a cooperating fixedly positioned indexing lever 60. The indexing disc 59 is carried in fixed jointly-rotatable relation to the star wheel 51 upon a spacer sleeve 61 slidably mounted upon a reduced diameter and extension 62 of the shaft 35. In the present instance the sleeve 61 provides an ample space between the star wheel 51 and the indexing disc 59 to accommodate the thickness of the gear 47 which, for compactness of structure, may be disposed with its periphery closely adjacent to the sleeve.

In its periphery, the indexing disc 59 has four equidistantly spaced notches 63 adapted to receive an indexing stud or pin 64 carried by the lever 60. Location of the notches 63 is so related to the star wheel arms 50 that registration of the pin 64 with any given one of the notches 63 will be coincident with completion of driven film-advancing movement of the associated star wheel arm 50. The notches are of ample depth and abruptness to effect such an interengagement with the pin 64 as to prevent positively dislodgment of the pin by rotary force applied to the disc 59.

Since the pin 64 must be released from the notch 63 in which it is engaged before the indexing disc and star wheel assembly can be rotated for advancing the film, means is provided for moving the lever 60 for this purpose in coordination with operation of the gear 47. Accordingly, the lever 60 is pivotally mounted intermediate its ends, as at 65, in such a position adjacent to the hub of the gear 47 that its rear end portion is received in a groove 67 (Fig. 1) in the space between the gear 47 and the adjacent frame wall 15. As the gear 47 rotates to initiate a film advancing operation, a dog 68 within the groove 67 engages the lever, slightly in advance of engagement by the stud 49 with the star wheel, thus tripping the lever to release the indexing pin 64 from its notch. Then as the stud 49 acts upon the star wheel, and the indexing disc 59 rotates to carry the vacated notch 63 beyond the indexing pin 64, the dog 68 releases the lever and the pin 64 rides upon the adjacent trailing unnotched periphery or inter-notch land portion of the indexing disc until completion of the one-frame advancing movement. Thereupon, the indexing pin 64 drops into the next succeeding notch 63 whereby to lock the shaft 35 and the film sprocket 32 stationary until the film advancement is repeated.

The lever 60 is normally biased towards interlocking position by means such as a tension spring 69. As a result, as one of the interlock notches 63 moves into registration with the interlock pin 64, the latter instantaneously snaps into the notch. This avoids any possible overrun of the film sprocket 32 and assures that after initial adjusting of the framing each succeeding picture image will be accurately framed and remains in frame until the film advancing cycle is repeated.

Provision is made for initially adjusting the framing of the picture images should proper registration thereof with the projection aperture not be attained when the film is threaded in place. Accordingly, the shaft 35 is adapted to be rotated on manipulation of the knob 39 to move the sprocket 32 for advancing or returning the film to the extent necessary for the adjustment. Since, however, the indexing structure normally locks the film-advancing means against movement, means are provided for quickly releasing the indexing structure and the shaft 35 for relative rotation, in this instance comprising a friction clutch 70. The latter includes a friction disc 71 driven into frictional engagement with the outer face of the star wheel 51 by a pressure washer 72 forced thereagainst by a preferably four-legged dished leaf type of tension spring 73 maintained under adjusted compression by a set of lock nuts 74 threaded onto the outer end portion of the shaft 35 against a washer 75. The spring 73 is preferably held nonrotatable upon the shaft extension 62 by engagement with a keying flat 76 on the extension. Through this arrangement, although the spool-like indexing and star wheel assembly is freely rotatably received through the medium of the sleeve 61 upon the reduced diameter extension 62 of the shaft, the combined frictional resistance afforded by the friction disc 71 and the abutting faces of the indexing disc 59 and the retaining collar 42 assures positive joint rotation of the indexing structure and the shaft 35 during normal intermittent film advancing operation of the indexing structure. However, during a projection interval and while the indexing interlock is in effect the clutch 70 can be slipped by rotation of the shaft 35 relative to the indexing structure by forcefully turning the knob 39. This arrangement enables minutely accurate framing adjustment because of the unlimited relative incremental rotation permitted between the shaft and the indexing structure by sliding the friction clutch 70.

According to the invention, release of the film 11 from the hold of the grippers 19 and 20 is coordinated with operation of the film advancing means in a simple and efficient manner by utilizing the indexing lever 60 to operate the gripper release actuating lever 31. Therefore the lever 60 is extended forwardedly to be of sufficient length normally to underlie the outer end portion of the lever 31. Moreover, the ratio of the distance from the fulcrum point at the lever pivot 65 to the indexing pin 64 to the distance between the pin 64 and the point of interengagement of the indexing lever 60 with the gripper-actuating lever 31 is such that relatively short pivotal motion of the indexing lever in the retraction of the pin 64 from the engaging notch 63 will nevertheless cause the indexing lever 60 to describe an ample actuating-lever motivating arc at the point of lever interengagement. For example, in one practical application of the invention a satisfactory ratio has been approximately one to four or five so that a notch-clearing movement of approximately $\frac{1}{16}''$ of the lever 60 at the indexing pin 64 has afforded an approximately $\frac{1}{4}''$ to $\frac{5}{16}''$ movement at the point of lever engagement. In order to avoid undue drag in the start of the lever action in such arrangement, it has been found desirable to permit the indexing lever 60 a lead movement of approximately one-fourth to one-third of the total lever motivating arc before becoming active to apply actual gripper releasing force to the actuating lever 31. It will thus be seen that the operation of the lever is smooth, positive, and direct in action with a minimum of drag or strain upon the drive motor or any of the operating parts.

While I have illustrated and described a certain preferred embodiment of my invention, it is to be understood that I do not thereby intend to limit the same to the specific form disclosed, but contemplate that various modifications, substitutions and alternative constructions may be effected without departing from the spirit and scope of the invention as defined in the appended claims.

I claim:

1. In a strip film projector construction, film guiding structure including means for releasably gripping a film strip therebetween to hold the strip in projecting position, means for actuating said gripping means to release the film for advancing movement, and means for intermittently advancing the film including an indexing structure adapted to define the limits of intermittent incremental frame-by-frame advance of the film strip, said indexing structure including a lever fulcrumed adjacent to the point at which it is active in the indexing structure and being movable in a given path in the operation of the indexing structure, said lever having a part thereof in addition to the requirements for indexing, said part extending beyond the indexing point and being effective in the movement of the lever to operate said gripper actuating means.

2. In combination in a strip film projector of the character described, a film guide structure including means defining a projection aperture, a film gate device including releasable gripper means for holding a strip of film in projection relation to said aperture, means including an actuating lever for periodically releasing said gripper means, means for intermittently advancing said film through said gate including an indexing disc having peripheral notches, an indexing lever rockably mounted adjacent to said disc and having a pin extending laterally therefrom and peripherally ridable upon said disc or engageable in one of the notches to index the position of the section of the film in said projection relation to said aperture in the interval between advances of the film, said indexing lever being operable while riding the unnotched periphery of said disc to hold the actuating lever in a position to release said gripper means but being arranged to release said actuating lever as an incident to movement of said pin into a notch in the periphery of the disc.

3. In combination in a strip film projector construction, film guiding means including releasable structure for gripping and holding a film strip immovable and flat in projecting position, means for intermittently advancing the film strip including indexing mechanism determinative of the limit of each frame-increment of film advance, said indexing mechanism including a disc having peripheral notches and an indexing lever including an element adapted to ride upon the periphery of the disc and engage in the peripheral indexing notches of the disc, said lever being fulcrumed adjacent to said element and having a relatively small arc of movement at the indexing point during the entering and leaving of the indexing notches by said element, said lever extending substantially beyond said indexing element and having a substantially greater arc of movement in the extending part than at the indexing point, and means for releasing said gripping means engaged and operated by the extending part of the lever.

4. In combination in a strip film projector construction, film guiding means including a gripper structure for holding the film flat and stationary in projection position, means for releasing said gripper structure to enable advance of the film through the guiding mean, means for intermittently advancing the film, and means for indexing the film advancing action of said advancing means by framed image increments including a member movable with the film advancing means and an indexing lever engageable with said member at predetermined indexing points, said lever being fulcrumed intermediate its ends and being engageable adjacent to one of its ends with the gripper releasing means, and means engageable with the lever adjacent to its opposite end portion for rocking the lever in timed relation to operation of the film advancing means to release the lever from said indexing member and cause the lever to actuate said releasing means.

5. In combination in a strip film projector, means for intermittently advancing a film strip by framed image increments, means for holding the film in a flat non-buckling projection position, means for releasing the holding means to enable advancing movement of the film including an actuating cam member movable bodily in a plane parallel to the film holding means, and indexing structure for said film advancing means including a lever operative in a plane angular to said actuating cam member and active as an incident to the operation of the film advancing means to move said cam in one direction for releasing the hold of said holding means upon the film and maintaining this condition while the film is being advanced relative to the holding means, said lever permitting movement of the cam in the opposite direction and the return of the film holding means to the initial film holding relationship thereof upon completion of a frame-increment of film advance.

OTTO R. NEMETH.

REFERENCES CITED

The following references are of record in the file of this patent:

UNITED STATES PATENTS

| Number | Name | Date |
|---|---|---|
| 1,679,399 | Brewster | Aug. 7, 1928 |
| 2,299,973 | Getten | Oct. 27, 1942 |
| 1,433,360 | Forman | Oct. 24, 1922 |
| 2,330,709 | Harper et al. | Sept. 29, 1943 |
| 1,427,575 | Brenkert et al. | Aug. 29, 1922 |
| 1,277,558 | Dumars et al. | Sept. 3, 1918 |
| 2,100,284 | Kriechbaum | Nov. 23, 1937 |
| 2,050,614 | Kerr | Aug. 11, 1936 |
| 2,294,585 | Thompson | Sept. 1, 1942 |